United States Patent [19]

Metzger et al.

[11] 4,120,008
[45] Oct. 10, 1978

[54] OVERLAP TRACK SERVO FOR DYNAMIC POSITION CORRECTION IN A ROTARY-HEAD TAPE RECORDER

[75] Inventors: Lenard M. Metzger, Rochester; Robert B. Johnson, Scottsville, both of N.Y.

[73] Assignee: Eastman Kodak Company, Rochester, N.Y.

[21] Appl. No.: 729,620

[22] Filed: Oct. 5, 1976

[51] Int. Cl.² .......................................... H04N 5/795
[52] U.S. Cl. ........................................ 360/70; 360/77; 360/84
[58] Field of Search ................... 360/70, 77, 75–76, 360/73, 84

[56] References Cited

U.S. PATENT DOCUMENTS

| 3,263,031 | 7/1966 | Welsh | 360/77 |
| 3,375,331 | 3/1968 | Masatoshi et al. | 360/84 |
| 3,474,432 | 10/1969 | Sevilla | 360/77 |
| 3,549,797 | 12/1970 | Dann | 360/70 |
| 3,838,453 | 9/1974 | Buslik et al. | 360/70 |

FOREIGN PATENT DOCUMENTS 46-22,502  6/1971  Japan .......................................... 360/70

Primary Examiner—John H. Wolff
Attorney, Agent, or Firm—Robert F. Cody

[57] ABSTRACT

A tracking control apparatus, for use with a rotating-head magnetic tape player, provides a tracking control head in fixed rotational association with a playback head so that both scan corresponding parallel paths across the width of the tape in fixed relationship with each other. By so mounting the tracking control head that it overlaps adjacent recorded tracks and senses periodic information included therein, the apparatus provides a control signal for driving a tape capstan servo without need for the additional control track usually required by such apparatus. The periodic information may be, for example, the horizontal sync of a video signal in the adjacent tracks; the control signal is then derived from a comparison of the respective amplitudes of such horizontal component from each track. Since the overlapping position of the tracking head is fixedly related to the tracking position of the playback head, the control signal is indicative of the tracking alignment of the playback head itself. By further mounting the tracking head on the playback head wheel, and by using the record head during playback for such purpose, a dynamic real-time tracking apparatus is provided which additionally dispenses with a separate tracking control head.

5 Claims, 7 Drawing Figures

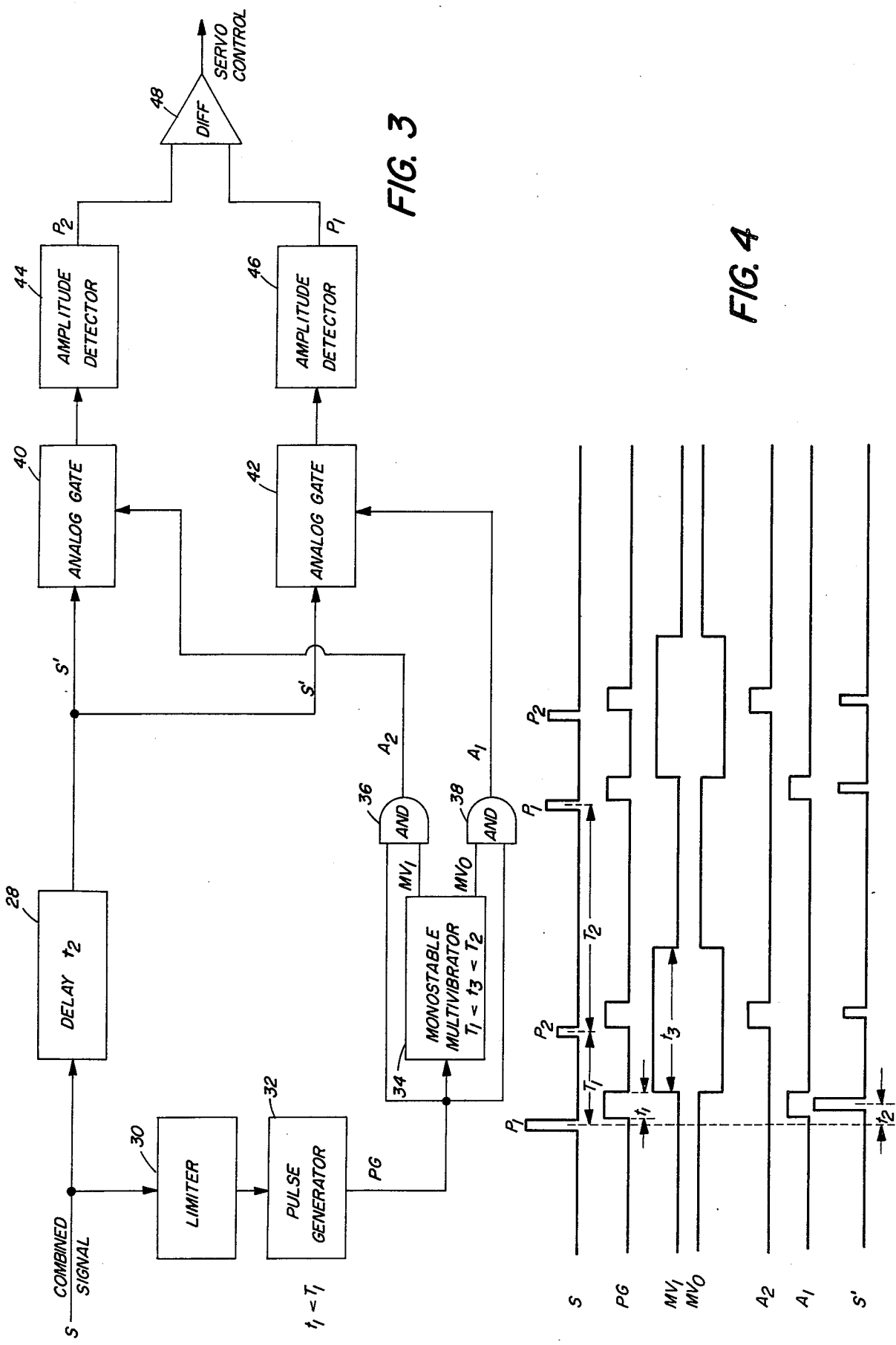

OVERLAP TRACK SERVO FOR DYNAMIC POSITION CORRECTION IN A ROTARY-HEAD TAPE RECORDER

CROSS-REFERENCE TO RELATED APPLICATION

This application is related to commonly assigned patent application Ser. No. 729,621, now U.S. Pat. No. 4,044,388, filed on Oct. 5, 1976, concurrently with the present application.

BACKGROUND OF THE INVENTION

1. Field of the Invention

The invention relates in general to servomechanisms for use with magnetic tape recorders; more specifically, the invention provides a playback servomechanism for so controlling the tape driving capstan that the recorded tracks will precisely line up with the path taken by the moving heads of a rotating-head magnetic tape recorder.

2. DESCRIPTION RELATIVE TO THE PRIOR ART

With reference to the tape recording art, tracking is the process of keeping a playback head on the path of a track already recorded on magnetic tape. Put another way, it is a measure of the ability of the head scan correctly the recorded track when in the playback mode. Since tracking basically refers to a positional adjustment, presently available magnetic tape players influence the tape scan by servo controlling the position of either the tape or the head with respect to each other.

Although tracking is a problem endemic to all tape players, it attains a particular significance in the case of rotary-head players where the playback head must follow one-by-one a plurality of track segments recorded across the width of the tape while the tape itself is advancing. The usual commercial, portable rotary-head tape recorder intended for use in home or business employs a helical-scan rotary head. In such a recorder, tracking control is provided by adjusting the speed of the rotating heads. The control process generally begins by providing a control track during the record mode. For example, if a video signal is being recorded, as each vertical sync pulse occurs, the video record head is rotated at such a speed that it has a predetermined location with respect to the tape. At this time, a pulse is recorded along the edge of the tape by a control track head. If the tape transport is running at an even speed, these pulses will be evenly spaced along the tape. Upon playback, the control track head — positioned a fixed distance from the playback head rotational axis — senses the control track and produces a pulse which is processed by the servo electronics and applied to a head servo to correct for transport errors.

Servos for head control in the playback mode generally use two signals: one for reference as to where the head should be in its rotational movement and the other for feedback as to where the head is actually located. The incoming pulse from the control track is used as the reference while a pulse from a head position sensor forms the feedback. The latter may, for example, be provided by a small magnet mounted inside the head drum on its rotating mechanism. A small pickup head detects its passage for each revolution of the head and generates a head position pulse. The degree to which the control track pulse coincides with the head position pulse determines the actual position of the playback head relative to the recorded track; appropriate correction is then rendered possible.

Since the pulses of the control track were recorded so as to coincide with a definite position of the record head, the physical distance of the control track head along the tape from the point where the video head began recording a given track is of critical importance. If this distance differs on playback from that obtained during record, the playback head — though properly adjusted insofar as the servomechanism is concerned — will not correctly follow the recorded track. It is as if the playback head follows a path in which the electronics expects the head to overlie the track — but in fact it does not. Similarly, a stretched tape or a control track head slightly out of alignment will cause a minor mistiming in the arrival of the control pulses to the servo, and a similar mistracking effect will result. Customarily, a tracking control is provided for delaying the control pulse electronically before it is compared to the feedback signal. This has the effect of moving the control head sideways until it correctly scans the control track. In actual use, the delay is manually varied until an acceptable television picture results.

Servos for capstan control, and particularly capstan servos in combination with head wheel servos, were first widely used in broadcast quad-head video recorders. Because of its complex aspects, including its servomechanisms, the quad-head recorder is far too large and complex for any use outside of the broadcast industry. With the advent of non-broadcast video tape usage, the smaller, simpler, and cheaper helical video recorder was preferred. To pare down the cost and size of a video recorder, a number of compromises had to be taken — including the simplification of the servomechanisms. Therefore, the practice of using the head servo for correcting playback tracking errors was economically logical since a head servo must be provided anyway during recording if a definite recording pattern — i.e., the location of the vertical sync — is to be established on the tape. Furthermore, if the output of the playback heads is "switches," a head servo is frequently used for coinciding the moment of playback switching with that obtained on recording.

Resort to a capstan servo is usually required, even for portable helical video recorders, if one of the recording features includes editing of a video signal. In that situation, the previously recorded video on the tape must be aligned accurately with a new incoming video. To do this, the speed of the tape must be varied until the vertical sync pulses of both signals align, and then the tape must be held at a constant speed to maintain this alignment. This ordinarily means that the capstan must be servo controlled.

The foregoing methods of servo control have been adapted in the various forms of commercially available helical recorders. Having said this, there remains proposals for other types of tracking control servos. One such proposal is seen in Japanese Pat. No. 46-22502, issued June 26, 1971. This patent discloses an apparatus for detecting longitudinal slip of a helical playback head as it begins to cross over and overlap two tracks. The video signal at that moment will include the desired horizontal sync from the playback video as well as an undesired horizontal sync from an adjacent track. The double sync thus produced when the playback head incorrectly overlaps two tracks is processed so as to provide a signal indicative of the direction of tracking error. The capstan speed is then adjusted to eliminate the track overlap and thereby to resume correct tracking. Known in the servo control art as a "bang, bang" type of control, the approach described in the Japanese patent requires an appreciable tracking error to produce a second sync signal in the playback signal that can be detected and used to change the tracking. No additional correction is available until the tracking is again in error sufficiently to produce another correction. Thus, besides being an intermittent control, such a tracking servo provides an imprecise control as well, since it depends on a gross degree of misalignment in order to generate a control signal.

Mistracking is a playback phenomenon; however, capstan servos are sometimes used during recording for ensuring that the tracks are laid down in some predetermined pattern. For example, U.S. Pat. No. 3,549,797 discloses a servo system that adjusts the tape speed for maintaining the horizontal sync on adjacent tracks in side-by-side alignment. Intended for record only, the system includes a pair of stationary pickup heads disposed toward opposite edges of the tape for scanning the tape in a longitudinal direction, crossing over the slant-tracks and sensing the incidence of horizontal sync pulses as they do. The incidence of horizontal sync pulses from opposite edges provide an indication of the alignment of sync pulses in adjacent tracks. When appropriate adjustment of the capstan is made, the tracks should mutually align so that corresponding image lines appear in adjacent slant-tracks. It is therefore hoped that the format of the tape will be more tolerant to crossover by the playback heads since, at least, corresponding elements of horizontal image lines would be the ones sensed by the improperly tracking head.

One basic problem with present systems of tracking control lies in the separation of the playback head from the point at which the tracking control signal is sensed. Being responsive to any condition impressed upon the tape, the control head not only replicates recording conditions but inseparably includes playback anomalies due to stretch, skew, and alignment errors introduced by the playback machine along the span of tape between the playback head and the control track head. Efforts to eliminate this problem may be simply to reduce the span of tape affected until the control point sensed is near, or at, the playback head itself. The Japanese patent hereinbefore mentioned is characteristic of this approach. However, since in that case the control information is sensed by the video playback head itself, it can only respond with an intermittent, "bang-bang" type of control.

SUMMARY OF THE INVENTION

The invention, in one of its basic aspects, teaches the continuous sensing of control information in adjacent tracks for establishing the position of a moving magnetic head, for example, a playback head, with respect to each track recorded across the width of a tape. For this purpose, a tracking head is provided that overlaps adjacent tracks and continuously reads back an information signal from each track. Control signals included in the information signal are sensed by the tracking head and form a composite signal in turn formed of individual control components from each track. By fixing the tracking head into a predetermined rotational association with the playback head, both heads scan corresponding parallel paths across the width of the tape in fixed relationship with each other. Such a relationship may be provided by mounting each head on a separate head wheel and slaving their rotation together. This means the degree to which the tracking head overlaps the adjacent tracks is directly related to the degree to which the playback head is overlying a recorded track.

The control components from each adjacent track, when compared to each other, have a distinct phase and amplitude relationship which relates to a particular degree or corresponding between the playback head and the recorded track. Given a reference phase and amplitude relationship corresponding to a "desired" tracking, the relative presence of the control components determines the direction and magnitude of mistracking. A control voltage corresponding to their relative presence is then generated for use in a magnetic tape recorder, for example, to vary the speed of a capstan drive. Furthermore, by using recurring portions of the information signal itself, tracking control can be maintained without separate need for a control signal.

While such a tracking head may conceivably be provided anywhere in the playback machine as long as it maintains a fixed rotational association with the playback head, an additional benefit is derived if the tracking head is mechanically associated with the playback head. For example, by mounting the tracking head on the head wheel in an appropriate position to overlap adjacent tracks while the playback head overlies a recorded track, the control signal derived therefrom will substantially reflect the dynamic, real-time conditions prevailing at the playback head itself. The problem of duplicating the tape conditions between the playback and control heads — including distance, stretch, and skew — is essentially avoided.

Furthermore, certain rotary-head tape recording machines already have an extra head, unused in playback, mounted on the head wheel together with the playback head. This unused head could be, for example, the record head. By providing a selective connection to the record head, it may be used for tracking control upon playback. Thus, not only has the control track been eliminated and a dynamic form of tracking control been introduced, but the tracking head itself may be dispensed with.

BRIEF DESCRIPTION OF THE DRAWINGS

The invention will be described with reference to the firgures, wherein:

FIG. 3 is a schematic illustration of one embodiment of the phase and amplitude detectors of FIG. 1;

FIG. 4 includes several pulse waveforms taken at designated points in the schematic illustration of FIG. 3;

DESCRIPTION OF THE PREFERRED EMBODIMENTS

Because rotary-head tape recorders are well known, particularly in connection with video recording, the present description will be directed in particular to elements forming part of, or cooperating more directly with, the present invention. Recorder elements not specifically shown or described herein may be selected from those known in the art. Although the following description will be directed in particular to embodiments for use with a helical recorder, it is clear that the basic aspects of the invention are applicable as well to any rotary head recorder.

Figure 1:
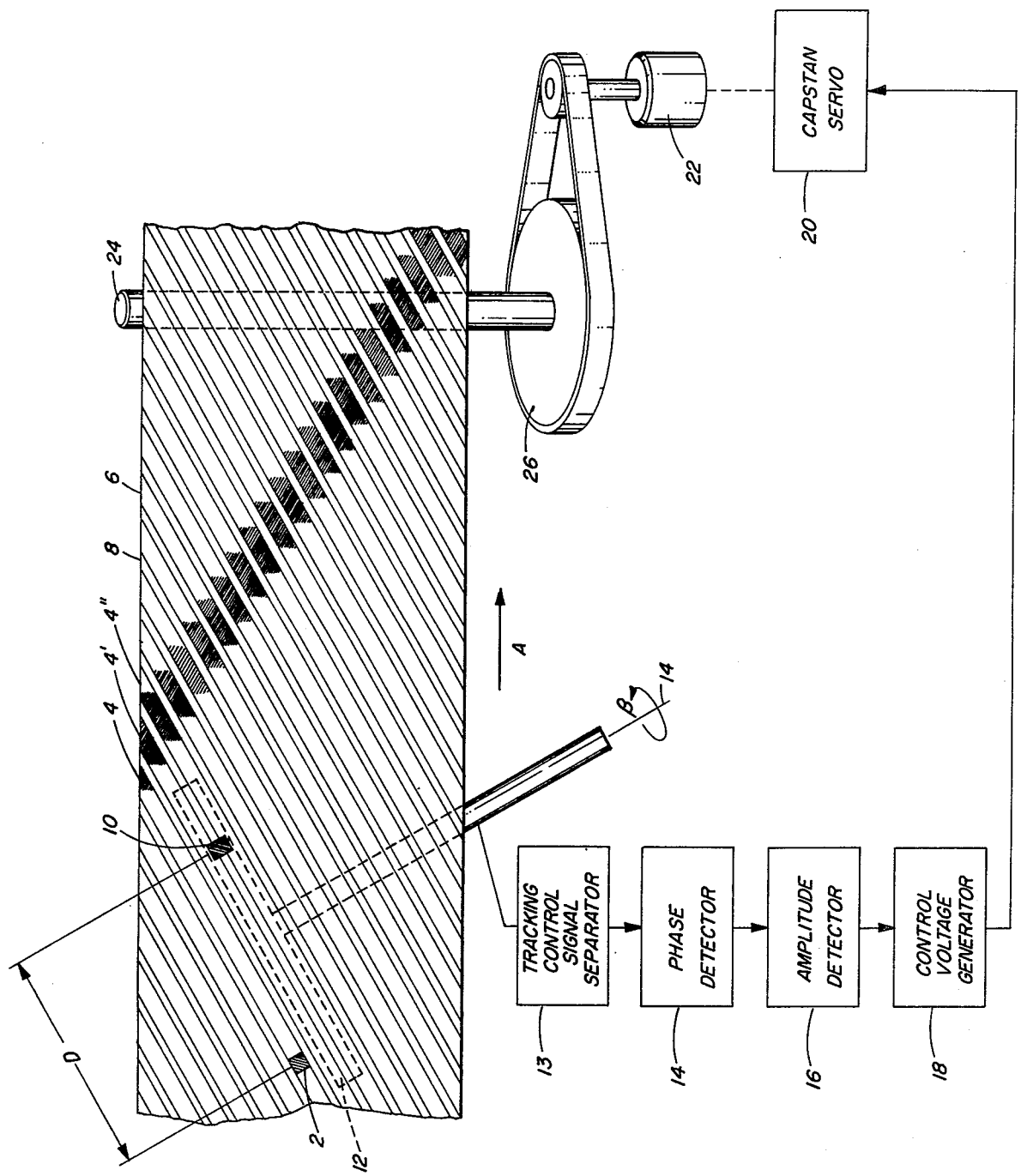
FIG. 1 is a diagrammatic illustration of a tracking control system in accordance with a presently preferred embodiment of the invention.

Referring now to FIG. 1, there are shown the basic components of a presently preferred embodiment of a tracking control system provided in accordance with the invention. Tracking alignment as used herein means the alignment of a playback head 2 to a slant track 4 prerecorded across the width of a tape 6. The slant track 4 may be provided by a conventional helical recording system in which the tape 6 is obliquely guided past a rotating head wheel on which a record head is mounted for rotation therewith. The slanted tracks thus recorded on the tape 6 are parallel to each other and separated by a guard band 8 which is ordinarily much narrower than the tracks themselves. The figures exaggerate the width of the track and guard band for purposes of illustration only; a typical format would include tracks of 6 mil width separated by a guard band of 2.7 mils. Of course, other formats are possible and usable with the invention. The playback head is adapted to follow a path overlying each recorded track 4 in sequence. For that purpose, the playback head 2 is customarily mounted on a head wheel for rotation in a manner similar to that provided during record. Furthermore, to ensure tracking, the tape 6 is driven at a speed in a direction shown by an arrow A which relates to that obtained during the recording operation. The remainder of this system is devoted to obtaining the precise speed that enables the playback head 2 to exactly overlie the track 4.

The tracking control system includes means for generating a tracking control signal. In the presently preferred embodiment the control signal is generated by a track position sensing means; in particular a tracking head 10 is mounted on the edge of a head wheel 12 about an axis 14 for rotation in a direction described by an arrow B. The tracking head 10 is so configured that it overlies adjacent tracks 4' and 4" when the playback head is overlying the track 4. To do this, the playback head 2 and the tracking head 10 must associate and cooperate in such a way that their respective positions vis-a-vis adjoining tracks must be maintained at all times. This interdependence, schematically shown by the constant D, is so illustrated to draw emphasis to the basic requirement of the invention. It is clear that a later embodiment — which shows both heads on the same head wheel — is a more efficient use of machine resources. This realization should not, however, color the basic inventive concept herein described. Other applications are within the concept; for example, the tracking head may be mounted on a separate wheel whose motion is slaved to that of the playback head wheel.

It is to be noted that, when the playback head 2 is correctly tracking the prerecorded track 4, the tracking head 10 will overlap respective adjacent tracks 4' and 4" to a predetermined degree. This means that the tracking head 10 is simultaneously sensing the signals magnetically present in both adjacent tracks 4' and 4". If a control signal is recorded along the length of adjacent tracks 4' and 4", the tracking head will sense its relative presence in each track and produce a composite signal that includes the control signal from each track. The control signal may be of any waveform having a parameter which is sensed by the tracking head 10 in accordance with the degree of overlap. The control information may be provided by a pattern of recurring pulses, for example, that are provided especially for use with the present apparatus.

Figure 2:
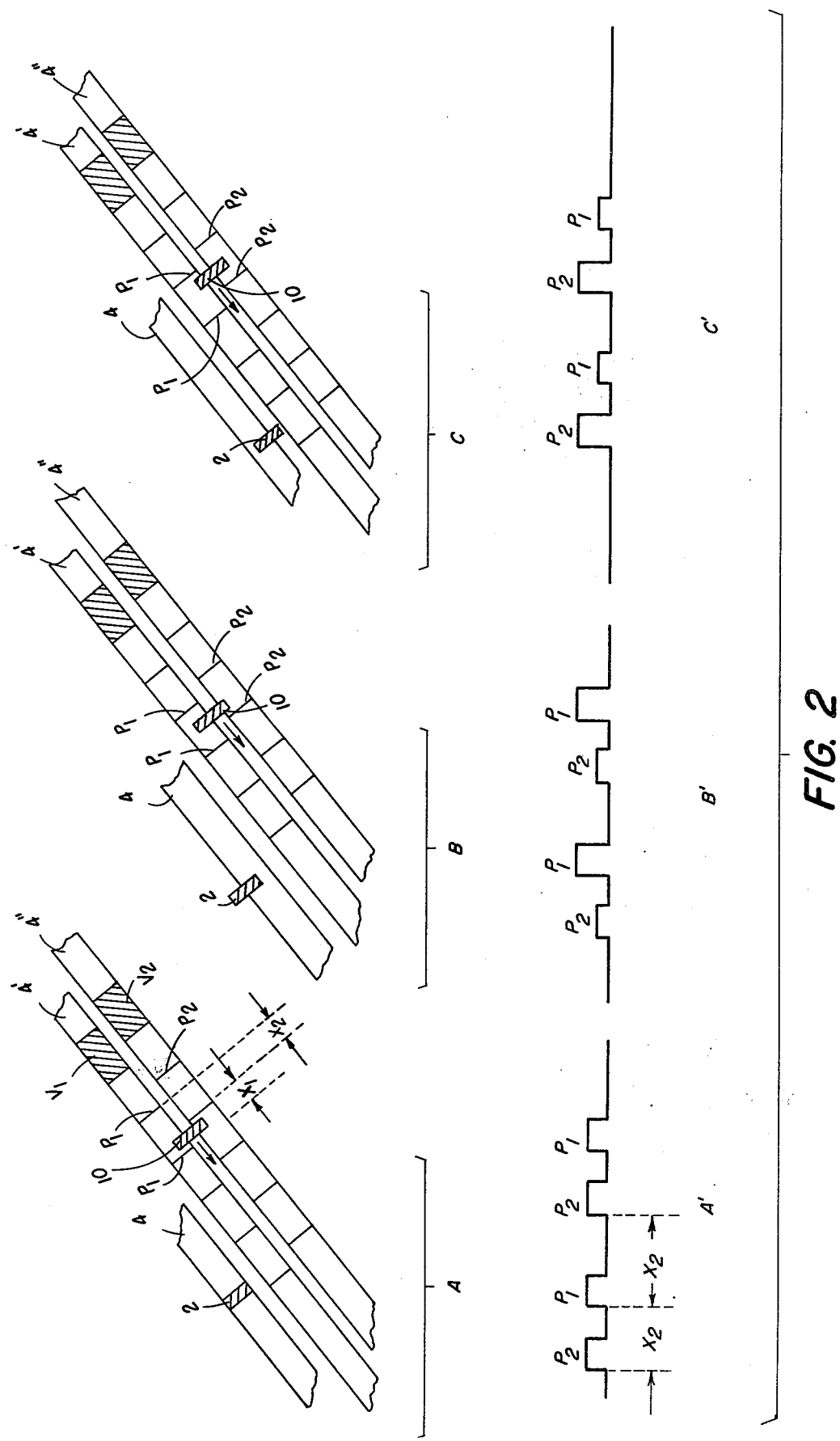
FIG. 2 is a diagrammatic illustration of three tracking conditions and the corresponding horizontal sync pattern derived therefrom.

More likely, and in a presently preferred embodiment intended for tracking a video signal, the horizontal synchronization pulses in adjacent tracks 4' and 4" are employed for rendering an indication of tracking. How this works is illustrated in FIG. 2. It is assumed for purposes of illustration that the tracking head 10 equally overlaps adjacent tracks 4' and 4" when the video playback head 2 exactly overlies the track 4. This situation is diagrammatically illustrated in FIG. 2A and the corresponding reproduced pulse waveform, or train of signals, is shown in FIG. 2A'. The pair of pulses $P_1$ and $P_2$ correspond, respectively, to horizontal sync signals located at predetermined positions along adjacent tracks 4' and 4". Because of the equal overlap, the pulses $P_1$ and $P_2$ have identical amplitudes. However, it is only necessary for the invention that some overlap occurs as long as the amount can be determined and used as a reference. The larger cross-hatched blocks $V_1$ and $V_2$ correspond to the vertical sync pulses in each adjacent track 4' and 4".

The invention requires the distinguishing of one pulse from another so that the capstan servo may be adjusted to make a proper correction. For that purpose, the horizontal sync pulse in adjacent tracks 4' and 4" are so arranged that the reproduced pulses $P_1$ following $P_2$ are separated by a distance $X_1$, whereas the reproduced pulses $P_2$ following $P_1$ are separated by a distance $X_2$. The separate distances enable the determination of which pulse is which; otherwise there would be no basis for determining in which direction there should be a correction. Admittedly, in the format prescribed in FIG. 2, there are certain limitations on how one track may be arranged with respect to its adjacent track for the invention to work. Namely, pulses $P_1$ and $P_2$ can neither be lined up equidistant nor coincident, else the identity of the pulses would be impossible to discern. This is not presumed, however, to limit the forms other embodiments may take.

FIG. 2 on to illustrate, in 2B and 2C, the two ways in which mistracking will manifest itself with respect to the tracking head 10 and how the corresponding output waveforms will look. FIG. 2B describes a situation in which the playback head 2 slips to one side of the track 4 so that tracking head 10 correspondingly slips into more of track 4' than track 4". This produces a pulse waveform, shown by FIG. 2B', in which the amplitude of the pulse $P_1$ — originating from track 4' — is greater than the amplitude of the pulse $P_2$. The converse situation is illustrated in FIG. 2C in which the playback head 2 slips to the other side of the track 4 so that now the tracking head 10 slips into more of track 4" than track 4'. This produces the converse waveform, shown by FIG. 2C', in which the amplitude of the pulse $P_2$ — originating from track 4" — is greater than the amplitude of the pulse $P_1$.

Returning now to FIG. 1, the information sensed by the tracking head 10 — including, in this embodiment, the pulses $P_1$ and $P_2$ — is delivered to a tracking control signal separator 13 which processes the composite signal from adjacent tracks 4' and 4" and provides a waveform output comprising substantially the tracking control signal by itself. The tracking control signal separator may take the form of a sync separator. Without limiting the forms which this signal may take, the presently preferred embodiment encompasses the pulse waveform shown variously by FIG. 2A', B', or C'. Next the tracking signal is processed by a phase detector 14 for determining the identity of each recurring signal, i.e., from which track 4' or 4" each signal component is originating. Once the signal components are distinguished, an amplitude detector 16 determines both the direction and degree of mistracking. The amplitude detector 16 drives a control voltage generator 18 that in turn delivers a control voltage to a capstan servo 20 for varying the nominal speed of a capstan drive 22. A capstan 24 is mounted for rotation on a flywheel 26 which is belt connected to a pulley on the drive 22.

In operation, when the tracking head 10 slips over into the track 4', the horizontal sync pulse $P_1$ from track 4' predominates over the horizontal sync pulse $P_2$ from track 4". The tracking control signal preparator 13 separates the pulse waveform illustrated in FIG. 2B' from the composite signal sensed in adjacent tracks 4' and 4". The subsequent phase detector 14 and amplitude detector 16 determine that the pulse $P_1$ exceeds the pulse $P_2$ by a certain amount. The amplitude detector 16 provides an output for driving the control voltage generator 18 in accordance with the magnitude of the difference between the amplitudes of pulses $P_1$ and $P_2$. The resulting voltage output of the control voltage generator 18 causes the capstan servo 20 to vary the speed of the capstan drive 22 such that the tape 6 slows up enough to permit the playback head 2 to regain a precisely centered position overlying the track 4. This condition will obtain when the pulse waverform illustrated in FIG. 2A' is regained.

A similar situation, but opposite in result, prevails when the tracking head 10 slips over into the track 4", as illustrated in FIG. 2C, and the horizontal sync pulse $P_2$ from track 4" predominates over the horizontal sync pulse $P_1$ from track 4'. What differs in this case is that the output of the control voltage generator 18 causes the capstan servo 20 to increase the speed of the capstan drive 22 until the playback head 2 regains a position precisely overlying the track 4.

Without intending to limit the embodiment described to a particular detector circuit, FIG. 3 illustrates a circuit for providing the phase and amplitude detection functions of FIG. 1. The signal waveforms at significant points in the circuit are illustrated in FIG. 4. A combined signal S is representative of the output signal provided by the tracking control signal separator 13. The combined signal S is applied simultaneously to a delay stage 28 and to a limiter 30. A pulse generator 32 receives the output of the limiter 30 and triggers pulses of duration $t_1$ in synchronism with the trailing edge of the horizontal sync pulses $P_1$ and $P_2$ in signal S. (See waveform PG in FIG. 4.) The pulse waveform PG serves simultaneously to trigger the monostable multivibrator 34 and to enable the AND gates 36 and 38. Two states, $MV_1$ and $MV_o$, describe the output of the multivibrator 34; one state is the inverse of the other. The multivibrator 34 is designed to initiate a pulse $MV_1$ of duration $t_3$ in synchronism with the trailing edge of the pulse output PG from the pulse generator 32. Due to signal pulse $P_1$, if signal pulse $P_2$ should happen to trigger $MV_1$ intially, the next pulse $P_1$ will trigger the multivibrator from then on.

At this point, it is well to note the interrelationships of the various timing sequences given to and initiated by this detector circuit. First, the combined signal S has two pulses, $P_1$ and $P_2$, corresponding to the horizontal sync from each of the two adjacent tracks 4' and 4". The pulse $P_1$ followed by $P_2$ comprise a pulse pair separated in time by $T_1$. The next pulse pair occurs at a time $T_2$ distant from the earlier pulse pair. Since the pulse generator 32 must emit a discrete pulse PG for every pule occurrence in the combined signal S, necessarily the pulse duration or width of PG is less than $T_1$.

The purpose of multivibrator 34 is to enable the AND gates 36 and 38 sequentially and in alternate synchronism wiht the pulses PG. The pulse $MV_1$ is initiated in synchronism with the trailing edge of pulse PG. Since it is to enable the AND gate 36 for a period extending through the occurrence of the pulse $P_2$ but not to include a subsequent pulse $P_1$, the pulse $MV_1$ must have a duration $t_3$ exceeding $T_1$ — the distance between pulses in a pair — but less than $T_2$ — the distance between pulse pairs. This insures that the only pulse provided at the output of the AND gate 36 corresponds substantially to the location of the pulse $P_2$ in the original combined signal S. Similarly, the absence of an output pulse $MV_1$ from the multivibrator 34 initiates the inverse pulse $MV_0$ for enabling the AND gate 38. The latter pulse $MV_0$ corresponds substantially to the location of the pulse $P_1$ in the original combined signal S.

Turning back to the other path followed by the combined signal S, the delay state 28 provides a delay of $t_2$ to the input signal S and provides an identical but delayed output signal $S^1$. This delay is necessary in order that the pulses $P_1$ and $P_2$ unambiguously coincide with the output pulses $A_2$ and $A_1$ from the AND gates 36 and 38, respectively. A pair of analog gates 40 and 42 are provided for referencing the output pulses $A_2$ and $A_1$ against the delayed signal S. Insofar as coincidence occurs between the pulses $A_1$ and $A_2$ and the pulse pair $P_1$ and $P_2$ in signal S, the latter pulses are provided to amplitude detectors 44 and 46. What this means is that the analog gate 40, by virtue of the pulse $A_2$ that is provided by the coincidence of pulses PG and $MV_1$, only passes the horizontal sync pulses $P_2$ from the combined signal S. On the other hand, the analog gate 42, by virtue of the pulse $A_1$ that is provided by the coincidence of pulses PG and $MV_0$, only passes the horizontal sync pulses $P_1$ from the combined signal S.

Now that the identity of the pulses in the combined signal S has been confirmed and their amplitudes have been determined by the amplitude detectors 44 and 46, it remains only to provide both amplitudes to the inputs of a differential circuit 48 that yields an output proportional to the magnitude of the difference in amplitudes. Such output can be further processed by the control voltage generator of FIG. 1 before varying the capstan motor speed.

Figure 5:
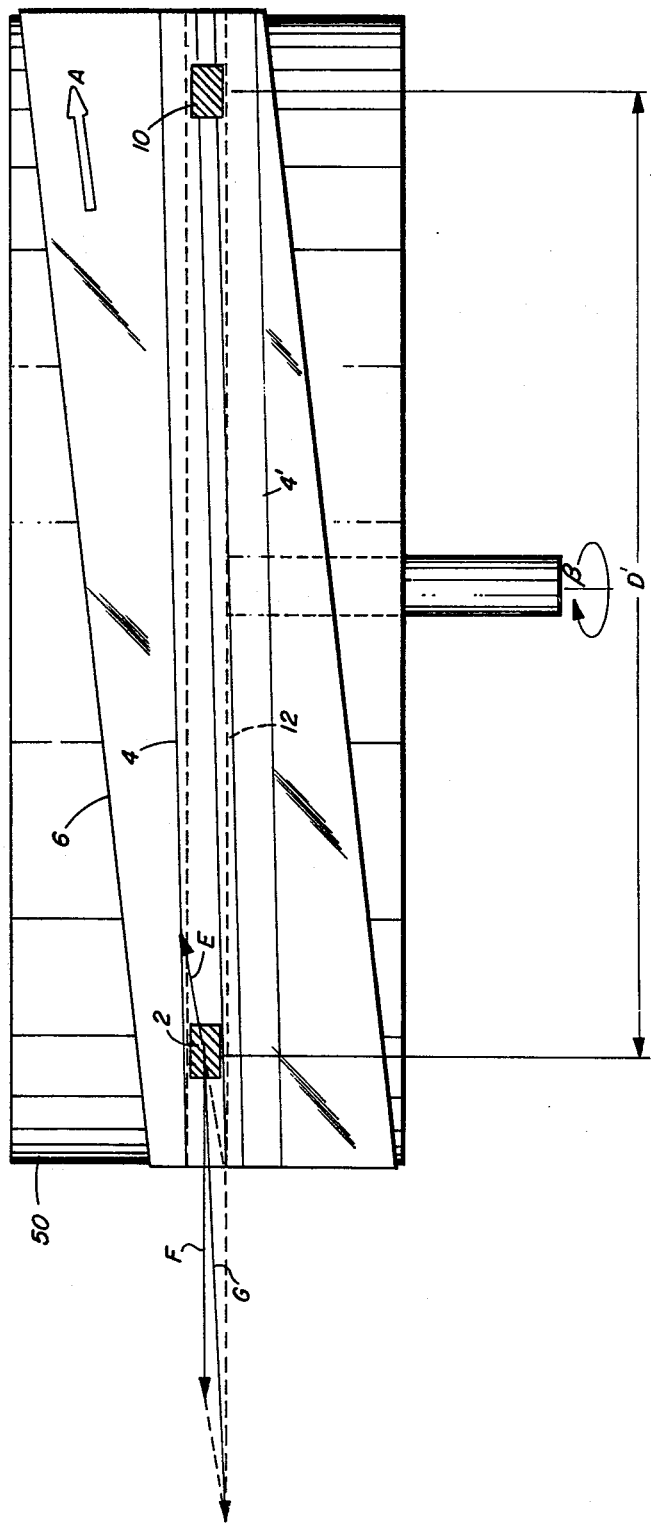
FIG. 5 is a view illustrating the respective alignment of a tracking and playback head when both are preferably mounted on a head wheel.

As shown in FIG. 1, the playback head 2 scans the track 4 in cooperation with the scan of the tracking head 10. Schematically depicted by the constant D in FIG. 1, this cooperation may take effect in several forms. FIG. 5 is useful in describing two further embodiments of the invention in which the tracking head 10 is fixedly associated with the playback head 2 being mounted together therewith on the same head wheel 12. As before, the head wheel 12 is mounted for rotation in the direction B around the axis 14. The head wheel 12 is further shown mounted for rotation inside a head drum 50 around which the tape 6 is wrapped. A circumferential slot is formed about the mid-section of the drum and exposes the heads 2 and 10 for contact with the tape 6.

In FIG. 5, the tape 6 is being driven by a capstan (not shown) in a direction described by the tape velocity vector E while the head wheel is rotated in a direction described by the head velocity vector F. The resultant vector difference of the tape velocity vector E and the head velocity vector F is a track velocity vector G which describes the path of the head 2 relative to the tape 6. FIG. 5 represents an isolated moment in time; it is seen from the track vector G how the track 4 shifts from the center of the head wheel 12 as the tape 6 is pulled further from the playback head 2. If the tracking head 10 is mounted on the head wheel 12, a distance D' from the playback head 2, it will overlap the track 4 and the adjacent track 4'. D' is not critical insofar as overlap is maintained; as explained hereinbefore, it is only critical that the amount of overlap be known for the detection circuits to function properly.

Putting the two heads upon the same head wheel 12 is particularly advantageous in that the tracking function is occurring substantially simultaneously with the playback function. This sort of dynamic, real-time tracking eliminates the influence of tape and machine irregularities that usually creep into the system between the point of playback and the point of tracking control, e.g., the points at which the video head and the control track head are located. With these influences gone, the capstan servo responds to the actual state of tracking substantially at the point of playback. It is true that the distance D' separates the playback head 2 from the tracking head 10 but the higher speed of the heads with respect to the tape insure that the lapse is momentary compared to the normal time ot tape transport from the head drum to a control track head.

Still further advantages are gained if the helical machine is one which is adapted to record as well as play back. In such a case, the record heads are unused during playback although they intermittently contact the tape in synchronism with the playback heads. FIG. 6A illustrates a typical placement of two record heads 52 and 54 with respect to a pair of playback heads 56 and 58 on a head wheel 12. Each head projects through a slot in the head drum 50 for contacting the tape 6. A cross-sectional view along line 60—60 would be similar to the view illustrated by FIG. 5. What is different here is that the record head 54 performs the function of the tracking head 10 during playback. Suitable switching apparatus (not shown) is provided for selectively connecting the head 54 to either the recording output circuits or the tracking signal input circuits.

Figure 6B:
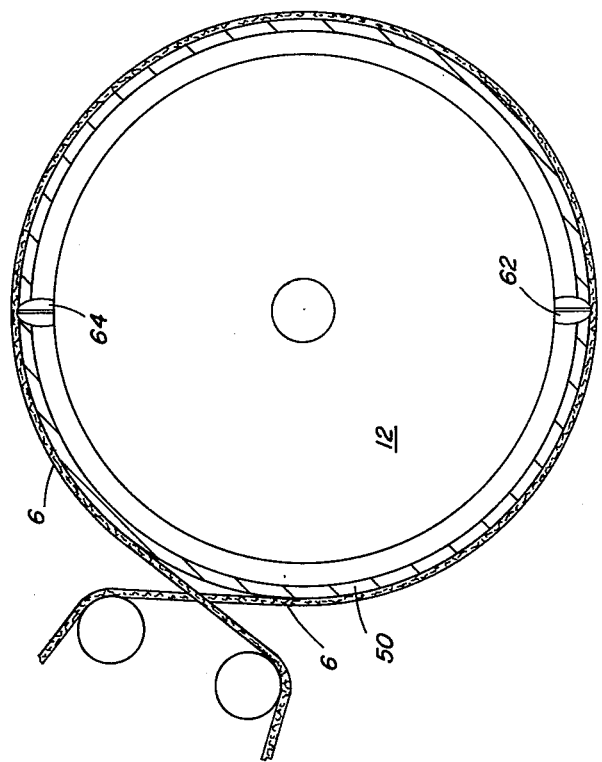
FIGS. 6A and 6B are plan views of the head wheel showing two possible tape wraps and the corresponding effect on the number of required tracking and playback heads.
Figure 6A:
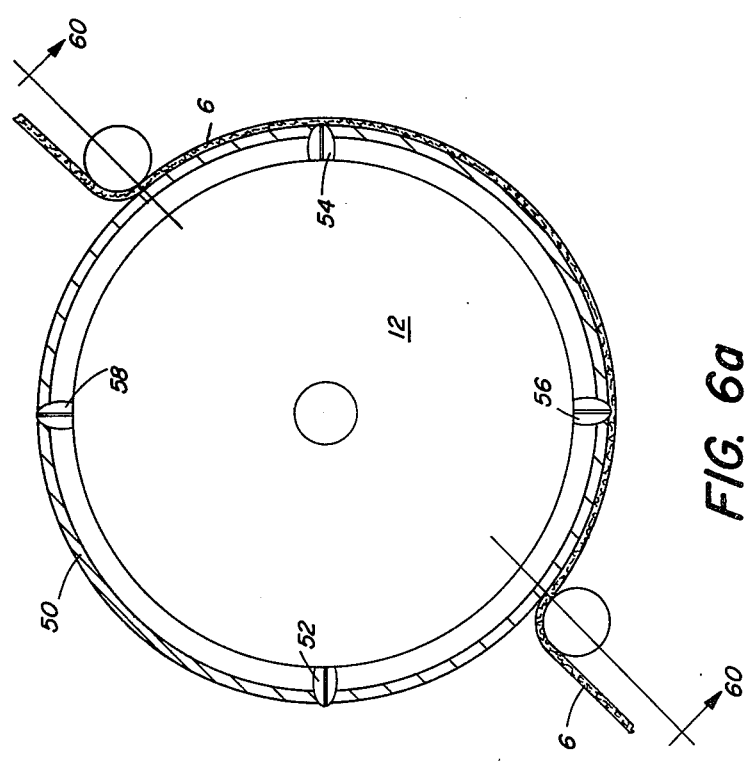

A similar view is shown in FIG. 6B of a head wheel 12 having a single playback head 62 and a single record/tracking head 64. Whereas the format of FIG. 6A prescribes a 180° tape wrap, the format of FIG. 6B is operable with a 360° tape wrape. In the latter case, the tape 6 is drawn onto the drum 50 at one level and exits the drum 50 at a different level. The net result of either format is that, in addition to dynamic tracking, the tracking head itself is eliminated as a separate entity.

The invention has been described in detail with particular reference to preferred embodiments thereof, but it will be understood that variations and modifications can be effected within the spirit and scope of the invention.

What is claimed is:

1. Apparatus for use in a magnetic tape player for aligning the path of a rotating playback head that generates a playback signal with a magnetic track helically recorded across the width of a magnetic tape having a plurality of such helical tracks recorded thereon, the apparatus comprising:
    means for supporting the playback head for rotation opposite said helical tracks;
    track sensing means mounted on said supporting means in fixed rotational association with the playback head, said track sensing means overlapping first and second adjacent ones of said helical recorded tracks on the magnetic tape for continuously reproducing a train of signals simultaneously with the playback signal, said train including first and second signal components from said first and second adjacent tracks respectively, said track sensing means defining a first overlapping position for producing said train of signals with said first and second signal components having a reference relationship when the playback head is aligned with one of said recorded tracks, said track sensing means defining a plurality of other overlapping positions corresponding to a plurality of misalignments between the playback head and said one recorded track, each said other overlapping position producing said train of signals with said first and second signal components having a corresponding relationship that differs from said reference relationship;
    circuit means connected to said sensing means for detecting said signal components and for identifying said first and second signal components as originating from said first and second adjacent tracks, respectively;
    means responsive to said first and second signal components for providing a tracking control signal that varies dependent upon the relative presence of said first and second signal components in said train of signals;
    tape driving means for moving the tape through a path in the tape recorder; and
    servo means responsive to said tracking control signal for causing said tape driving means to maintain a tape movement that has said one recorded track aligned with the path of the moving playback head.

2. The apparatus of claim 1 wherein said supporting means comprise a head wheel on which the playback head and said track sensing means are together mounted for rotation therewith.

3. The apparatus of claim 1 wherein said first and second signal components comprise synchronization pulse information from a video signal recorded on said first and second adjacent helical tracks, respectively.

4. In a magnetic video tape player having a capstan servo for controlling the speed of a magnetic tape in accordance with a control signal obtained from the video information,
    (a) a plurality of adjacent helical recorded tracks on said tape, adjacent ones of said tracks being separated by a guard band, and having synchronization information recorded thereon,
    (b) a head wheel mounted for rotation with respect to said tape, the head wheel having a first peripheral position continuously associating with a single helical track and a second peripheral position continuously associating with adjacent helical tracks, and (c) a playback head mounted at said first position on the head wheel for rotation therewith, the improvement comprising:
  (1) a tracking head mounted at said second position on the head wheel for rotation therewith in fixed association with said playback head for continuously straddling adjacent helical tracks whenever said playback head is substantially overlying a helical playback track and for increasingly straddling one or the other said adjacent track when said playback head slips off said helical playback track in one or the other direction, said tracking head adapted to reproduce a continuous train of signals including a composite synchronizing components from said synchronizing information in each of said adjacent tracks, said component having a pair of amplitude parameters relatively determined by the degree of overlap between said tracking head and each of said adjacent tracks; and
  (2) means responsive to said amplitude parameters of said composite synchronizing component for providing said control signal to said capstan servo, whereby the speed of the magnetic tape is so controlled that the playback head is held in alignment with each helical track.

5. The apparatus of claim 4 in which the plurality of adjacent helical recorded tracks are provided, during a separate recording operation, by a record head also mounted on said head wheel together with said playback head for rotation therewith, the further improvement wherein said tracking head comprises:
  (a) said record head; and
said apparatus further comprises:
  (b) means selectively connecting said record head to said responsive means during the playback operations, whereby said record head straddles said adjacent helical tracks during playback.

* * * * *